(12) United States Patent
Patel et al.

(10) Patent No.: US 11,667,510 B2
(45) Date of Patent: Jun. 6, 2023

(54) BEER TAP MONITORING SYSTEM

(71) Applicant: Amish Patel, San Dimas, CA (US)

(72) Inventors: Mahesh Patel, Upland, CA (US);
Amish Patel, Chino Hills, CA (US);
Anish Patel, Upland, CA (US)

(73) Assignee: Amish Patel, San Dimas, CA (US)

( * ) Notice: Subject to any disclaimer, the term of this patent is extended or adjusted under 35 U.S.C. 154(b) by 186 days.

(21) Appl. No.: 16/915,902

(22) Filed: Jun. 29, 2020

(65) Prior Publication Data

US 2021/0403309 A1 Dec. 30, 2021

(51) Int. Cl.
*B65B 3/04* (2006.01)
*B67D 1/12* (2006.01)
*B67D 1/08* (2006.01)
*B67D 1/14* (2006.01)
*H04N 23/54* (2023.01)
*H04N 23/55* (2023.01)
*H04N 23/56* (2023.01)
*H04N 7/18* (2006.01)

(52) U.S. Cl.
CPC ......... *B67D 1/1234* (2013.01); *B67D 1/0888* (2013.01); *B67D 1/1477* (2013.01); *H04N 23/54* (2023.01); *H04N 23/55* (2023.01); *H04N 23/56* (2023.01); *H04N 7/183* (2013.01)

(58) Field of Classification Search
CPC .. B67D 1/1234; B67D 1/0888; B67D 1/1477; B67D 2210/00091; B67D 1/1405; H04N 5/2253; H04N 5/2254; H04N 5/2256; H04N 7/183; H04N 7/18
USPC .......................................................... 222/41
See application file for complete search history.

(56) References Cited

U.S. PATENT DOCUMENTS

| 4,094,335 | A | * | 6/1978 | Haensch | B67D 1/0838 |
| | | | | | 137/317 |
| 5,431,302 | A | * | 7/1995 | Tulley | B67D 7/303 |
| | | | | | 222/14 |
| 5,586,691 | A | * | 12/1996 | Gotch | G09F 23/04 |
| | | | | | 222/113 |
| 5,750,905 | A | | 5/1998 | Weimer | |
| 8,304,699 | B2 | | 11/2012 | Fliess | |
| 9,652,756 | B2 | | 5/2017 | Knecht | |
| 10,294,093 | B1 | | 5/2019 | Volftsun | |
| 2007/0115372 | A1 | * | 5/2007 | Wu | H04N 5/2351 |
| | | | | | 348/230.1 |
| 2010/0264160 | A1 | * | 10/2010 | Simmonds | B67D 1/1405 |
| | | | | | 222/144.5 |
| 2013/0245819 | A1 | * | 9/2013 | Davenport | B67D 1/0872 |
| | | | | | 222/25 |

(Continued)

FOREIGN PATENT DOCUMENTS

GB 2542159 A 3/2017
WO 2014199894 A1 12/2014

*Primary Examiner* — Gims S Philippe
(74) *Attorney, Agent, or Firm* — Procopio, Cory, Hargreaves & Savitch LLP

(57) ABSTRACT

A monitoring system of a beer tap station is disclosed. The monitoring system can determine when a beer is being dispensed from the beer tap station and also which beer tap of the beer tap station is being pulled (i.e., which beer is being dispensed). The monitoring system also receives customer transaction data from a point of sale system and correlates data between the monitoring system and the point-of-sale system to detect errors and unauthorized serving of beer.

17 Claims, 5 Drawing Sheets

(56) References Cited

U.S. PATENT DOCUMENTS

| | | | |
|---|---|---|---|
| 2014/0372505 A1* | 12/2014 | Robinson | G06Q 30/0252 |
| | | | 709/202 |
| 2019/0071298 A1* | 3/2019 | Tomforde | G07F 13/065 |
| 2019/0292037 A1 | 9/2019 | Nicol | |
| 2020/0095111 A1* | 3/2020 | Lorkowski | A61N 1/0468 |
| 2020/0122994 A1* | 4/2020 | Cimatti | B67D 1/0034 |
| 2021/0139309 A1* | 5/2021 | Alpmen | B67D 1/08 |

\* cited by examiner

| Beer Tap # | Time | Date | Duration | Price | Beer Tap # | Size | Price | Bartender Id | Transaction Time | Transaction Date |
|---|---|---|---|---|---|---|---|---|---|---|
| 4 | 6:25 PM | 12/31/XX | 4.27 sec | $5 | 4 | small | $5 | B1 | 6:28 PM | 12/31/XX |
| 3 | 6:30 PM | 12/31/XX | 6.50 sec | $8 | 3 | small | $5 | B1 | 6:31 PM | 12/31/XX |
| 4 | 6:32 PM | 12/31/XX | 4.38 sec | $5 | 4 | small | $5 | B2 | 6:40 PM | 12/31/XX |
| 3 | 6:35 PM | 12/31/XX | 6.9 sec | $8 | 3 | large | $8 | B2 | 6:41 PM | 12/31/XX |
| | | | | $26 | | | $23 | | | |

FIG. 5

BEER TAP MONITORING SYSTEM

STATEMENT RE: FEDERALLY SPONSORED RESEARCH/DEVELOPMENT

Not Applicable

CROSS-REFERENCE TO RELATED APPLICATIONS

Not Applicable

BACKGROUND

The system and method described herein relate to a system that monitors a beer tap station and correlates that data to a point-of-sale system to track errors and unauthorized beer servings.

Various systems exist to monitor beer taps. However, they are not easy to implement and costly.

Accordingly, there is a need in the art for an improved monitoring system for the beer tap station.

BRIEF SUMMARY

The system and method described herein relate to a monitoring system in which a single camera can monitor one or more beer taps to determine which beer tap has been pulled and for how long. With this data, the system can determine which beer has been dispensed and the volume of beer that has been dispensed. The system may also have a computer that receives this data and correlates it along with data from a point-of-sale system to detect errors and unauthorized beer servings.

More particularly, a monitoring system for a beer tap station is disclosed. The system may comprise a beer tap, a mounting bracket, a video camera, and a computer. The beer tap may have a handle and a faucet. The handle may have an up position where beer is not flowing through the faucet and a pulled position where beer is flowing through the faucet. The mounting bracket may be disposed above and in front of the beer tap. The video camera may be mounted to the mounting bracket with a field of view of the video camera encompassing the handle of the beer tap. The computer may receive video pixel by pixel data from the video camera. The computer is operative to assign a light level to each pixel to determine when and how long the beer tap handle has been traversed from the up position to the pull position then back to the up position.

The video camera may be an infrared video camera. Also, the system may further comprise an infrared light adjacent to the video camera. The infrared light may be positioned to shine infrared light onto the beer tap handle.

Alternatively, the video camera may be an optical video camera with an infrared filter positioned in front of a lens of the optical video camera. The system may further comprise an infrared light adjacent to the video camera and be positioned to shine infrared light onto the beer tap handle.

The computer may track a number of pixels that a pattern moves when the computer determines that the handle has been traversed from the up position to the pulled position.

The video camera may in the alternative, be an optical video camera. The system may further comprise an infrared filter and an infrared light. The infrared filter may be positioned (i.e., disposed) in front of a lens of the optical video camera for filtering in infrared light into the optical video camera. The infrared light may be disposed adjacent to the optical video camera so that infrared light is directed toward the beer tap handle, reflected off of the beer tap handle and received by the optical video camera.

The system may further comprise a dark background behind the beer tap handle so that the optical video camera sees the dark background when a bartender traverses the beer tap handle to the pulled position.

The beer tap may be positioned in a bar without a line of sight to an exterior window.

In another aspect, a method of monitoring a beer tap is disclosed. The method may comprise the steps of receiving pixel data of a beer tap handle from a video camera positioned with its field of view encompassing the beer tap handle, the pixel data associated with light levels; transmitting the pixel data to a computer; and analyzing the pixel data by comparing two frames to determine if and when the beer tap handle has been pulled from an up position to a pulled position and back to the up position.

The method may further comprise steps of defining an area of interest in the camera's field of view to correspond to the beer tap handle, and the analyzing step includes analyzing the video data in relation to only the area of interest.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 5 is a table of data aggregated from the monitoring system of the beer tap station and the point of sale system.

DETAILED DESCRIPTION

Figure 1:
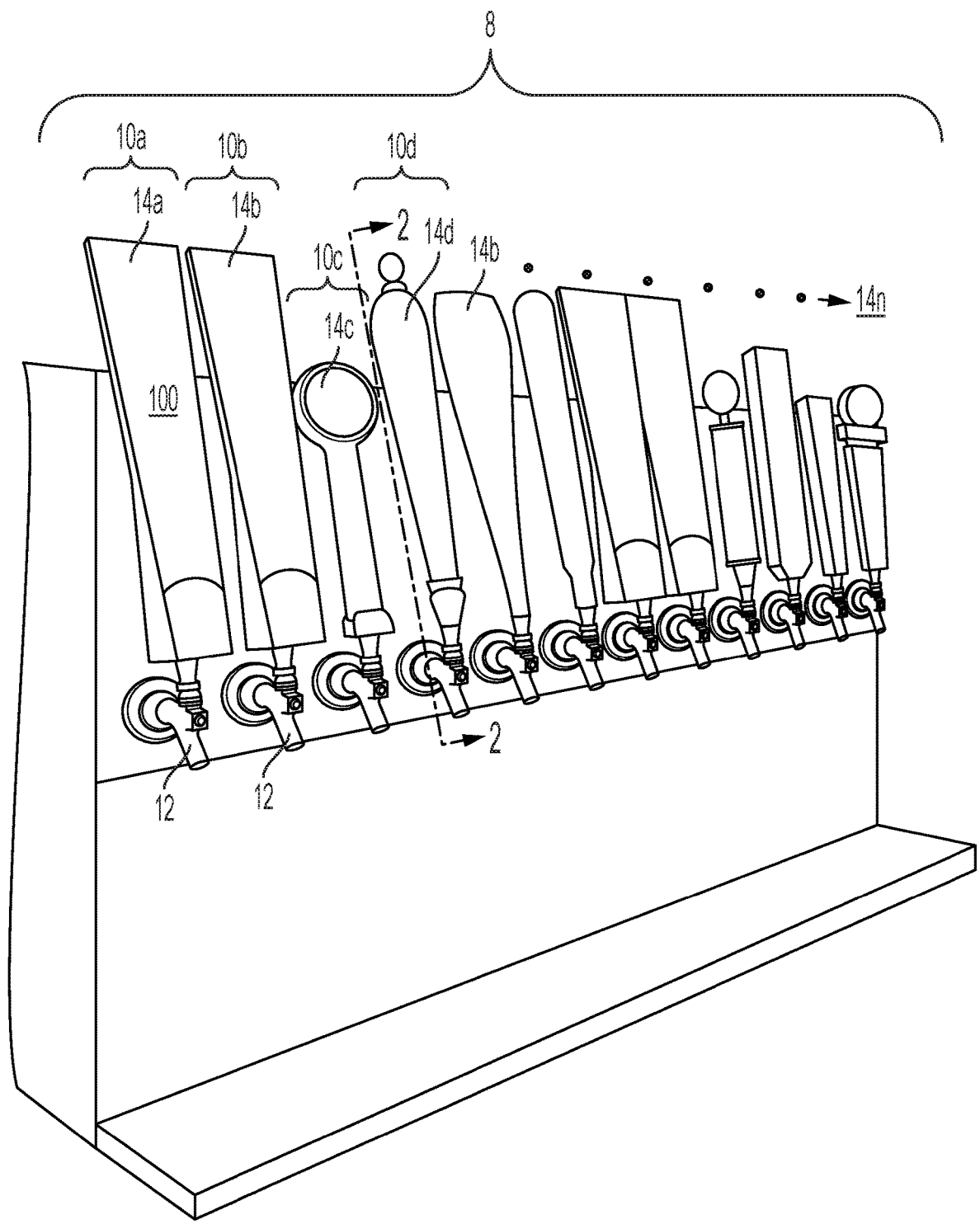
FIG. 1 is a perspective view of a beer tap station.

Referring now to the drawings, a beer tap station 8 is shown. The beer tap station 8 may have a plurality of beer taps 10*a-n*. Each beer tap 10*a-n* may have a faucet 12*a-n* and associated handle 14*a-n*. A monitoring system disclosed herein allows a single camera 16 (see FIG. 2) to determine the amount of beer being dispensed through each of the faucets 12 and to correlate that beer dispensing data with a point of sale system 15 of the bar to detect errors. The single-camera 16 may be positioned preferably above and in front of the handles 14*a-n*. The single-camera 16 may be sufficiently high to that the single-camera 16 has a direct line of sight to the handles 14*a-n* and is not interrupted when the bartender operates the beer tap station 8. The camera 14 monitors a point or an area (e.g., bounded box) of each of the handles for any movement. When the movement of a handle is detected, a computer 16 records various data regarding which beer is being dispensed, date and time of dispensing and time duration of pull. The computer also receives data from a point-of-sale system 15 regarding customer transactions. The data from the monitoring system and the point-of-sale system 15 may be correlated with each other to detect unauthorized beer servings and other possible errors.

Figure 2:
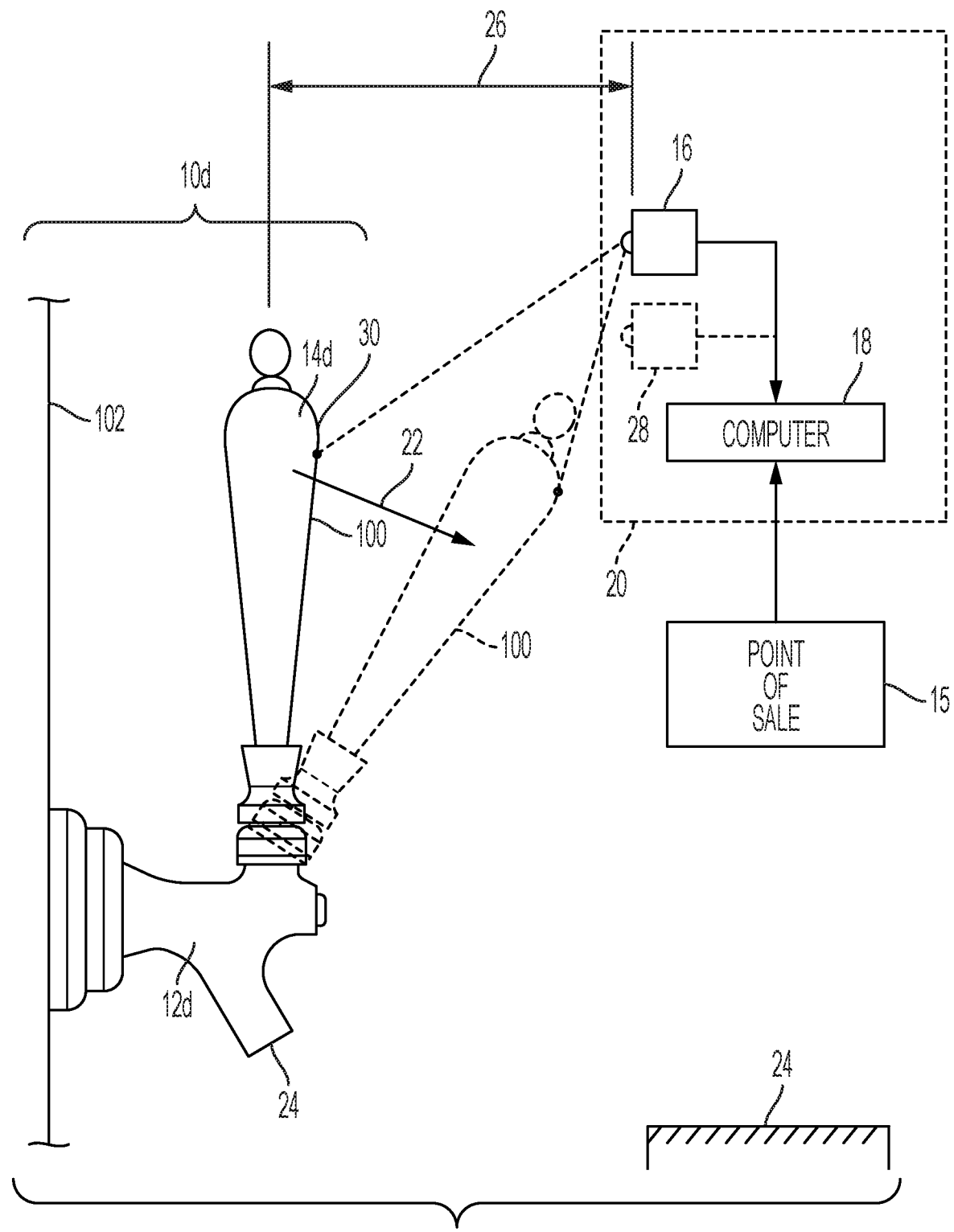
FIG. 2 is a side view of one of the beer taps shown in FIG. 1 and a monitoring system and point-of-sale system.

Referring now to FIG. 2, a side view of one beer tap 10d is shown. The beer tap 10d may have a faucet 12d and a handle 14d. During operation of the beer tap 10d, the user (i.e. bartender) pulls the handle 14d in the direction of arrow 22. When the handle 14 is pulled fully forward, beer is dispensed through the faucet 12 via its outlet 24. Normally, the handle is at an elevation greater than 30 inches from the ground, and more preferably greater than 35 inches. More preferably, the beer tap handle 14 is located about 48 inches above the ground. The high elevation of the beer tap handle 14 is beneficial because the camera 16 is mounted above the handle 14 and a line of sight between the camera 16 and the beer tap handle 14 is not blocked by the user (e.g., bartender) walking back and forth behind the counter of the bar. Put simply, the camera preferably has an uninterrupted line of sight to the beer tap handle 14 at all times.

The camera 16 may be mounted above, and in front of the beer tap handles 14 so that the camera 16 has a field of view that encompasses two or more beer tap handles 14. The camera's field of view may be sufficiently large to cover about eight (8) to twelve (12) beer tap handles 14a-h. Although the various aspects of the system and method discussed herein is in relation to twelve (12) beer tap handles, it is contemplated that the various aspects of the system and method may be utilized to monitor a single beer tap or a beer tap system having more than twelve (12) beer taps (e.g., 24 beer taps).

As discussed herein, the camera may be located above the counter 24 of the bar, as shown in FIG. 2. Preferably the camera 16 is disposed at an elevation of about 8 to 10 feet above the ground. The camera 16 may also be located about 4 to 10 feet in front of the beer tap handles 14 as identified by distance 26 in FIG. 2. The handles 14 and the camera 16 may be located sufficiently high above the ground so that people walking behind the counter of the bar does not block the line of sight between the camera 16 and any of the handles 14 of the beer tap station 8 which are being monitored.

The camera 16 may be an infrared camera 16a, an optical camera 16b with an infrared filter in front of its lens, a monochrome camera or an optical camera 16. The infrared camera 16a predominantly detects the reflected infrared light off of the handles 14. The benefit of utilizing an infrared camera 16a and corresponding infrared light 28 to see movement of the handles 14 is that this combination of infrared camera 16a and infrared light 28 is less susceptible to error when there is a change of light in the visible spectrum. By way of example and not limitation, when a patron walks across the bar, or the user (e.g., bartender) walks close by the beer tap handles 14, the reflection or the amount of visible light being reflected off of the handles 14 changes. However, these changes predominantly affect changes to the visible light spectrum, not the infrared spectrum of light. As such, any changes to the visible spectrum of light due to people walking across or near the beer tap station is not detected by the infrared camera. Moreover, if the beer tap station is placed by a window, the fluctuation of visible light due to the difference in daylight and nighttime will not significantly affect the operation of the infrared camera 16a and the infrared light 28.

Instead of an infrared camera 16a, it is also contemplated that the camera may be an optical camera or monochrome camera with an infrared filter so that the camera predominantly detects light from the infrared light being reflected off of the handle 14. In this setup, the infrared camera 28 still shines infrared light on the handles 14, which is seen by the optical camera 16b. The infrared filter blocks out the visible spectrum of light so that changes in the visible spectrum of light does not cause errors or inaccurate detection of handle movement.

Although the camera 16 may be an infrared camera, monochrome camera or an optical camera with an infrared filter, it is also contemplated that the camera 16 may be an optical or monochrome camera that detects the visible spectrum of light. In this regard, the infrared light 28 is not needed. Rather, the ambient light reflected off of the handles 14 may be used by the camera 16b to detect the movement of the handles 14. However, the room in which the beer tap station is situated in must not be next to a window or a place where there is movement which might trigger a false beer tap handle pull. Moreover, it is also contemplated that a strong supplemental light may be shined upon the front face 30 of the beer tap handle 14 closer to (e.g., 1 foot away) the beer tap handle 14. The supplemental light may be sufficiently bright to overpower fluctuations caused by night time and day time fluctuations and fluctuations caused by movement of people near the handles 14. In this way, the movement of people in front of the beer tap handles 14 does not affect the amount of light being reflected off of the front faces 30 of the beer tap handles 14. The optical or monochrome video camera is able to consistently detect a handle pull.

Figure 3:
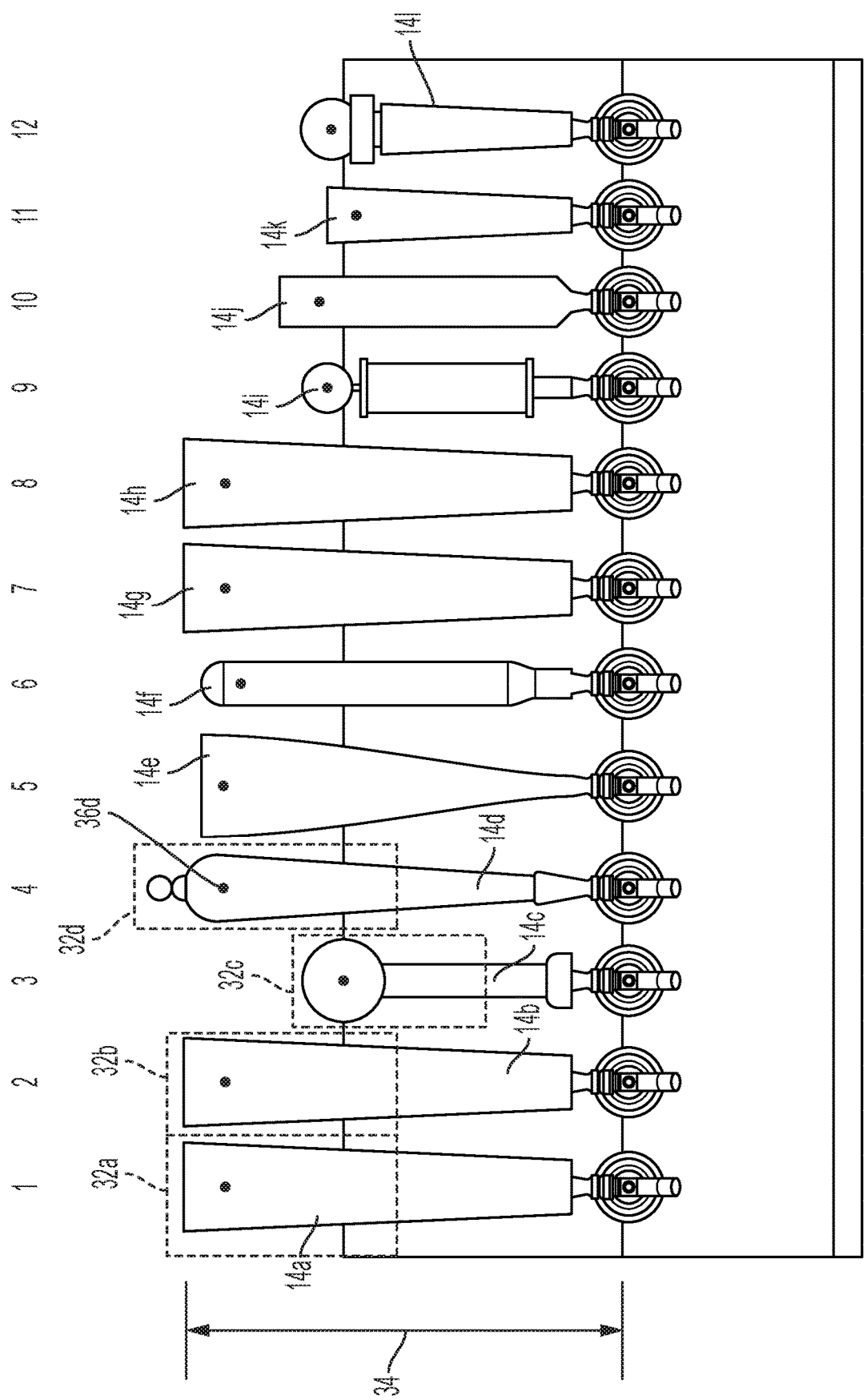
FIG. 3 is a first screenshot of the beer tap station from a camera of the monitoring system with all handles in an up position.

The camera 16 may send a video feed to a computer 18. The computer 18 may analyze the video feed on a pixel by pixel basis to detect movement and the degree of movement of the beer tap handle 14. Referring now to FIG. 3, the camera 16 may have a field of view that encompasses all 12 beer tap handles 14a-1. The computer may have a computer program that deciphers changes in light levels for each of the pixels in a certain area regarding each of the beer tap handles 14. By way of example and not limitation, the computer 18 may detect changes in light levels of each pixel within a bounded box 32. The bounded box 32 for each handle 14 may be set up during the installation of the system. In particular, the camera 16 may be mounted in front of and above the beer tap handles 14. When the camera is fixed in place, the field of view of the camera is shown on a computer monitor. The installer may draw a box around each of the beer tap handles 14a-n, which defines the bounded box 32a-n. Any changes to the light levels in the pixels outside of the bounded box 32 are ignored by the computer 18. Any changes to the light levels of the pixels within the bounded box 32 are recorded and analyzed.

Each handle 14a-1 is associated with a bounded box 32a-1. Regardless of the height 34 or any other differences between any of the handles 14, the system can monitor the handle 14 because the installer draws a bounded box 32 around the handle 14. If the handle 14 is smaller, then the bounded box 32 is drawn at a lower level. If the handle is taller, then the bounded box 32 is drawn at a higher level. No special equipment is needed if the handle is larger, smaller, round, square or any other shape. The monitoring system disclosed herein can account for a variety of beer tap handle sizes and shaped yet still accurately detect movement and the degree of movement. The camera views the bounded box 32, and the video feed from the camera 16 is transmitted to the computer. The computer determines when the handle 14 has been pulled based on when the light levels of the pixels within the bounded box 32 have shifted. In this way, the camera 16 can determine the movement of the handles 14. Preferably, the bounded box 32 is drawn around an upper portion of the handle 14 because the greatest amount of changes to the light levels of the pixels will occur when the handle 14 is pulled. The computer keeps track of the pixels in the bounded box to determine whether the handle 14 has been pulled. When the light levels of each of the pixels in the bounded box indicate that the handle has been pulled, the computer registers that the beer is being dispensed from the beer tap. Conversely, when the light levels of each of the pixels in the bounded box indicate that the handle has been traversed back to the up position, the computer registers that the beer is no longer being dispensed from the beer tap. The computer registers the time and date, the duration of time of the pull of the handle and the specific handle.

Figure 4:
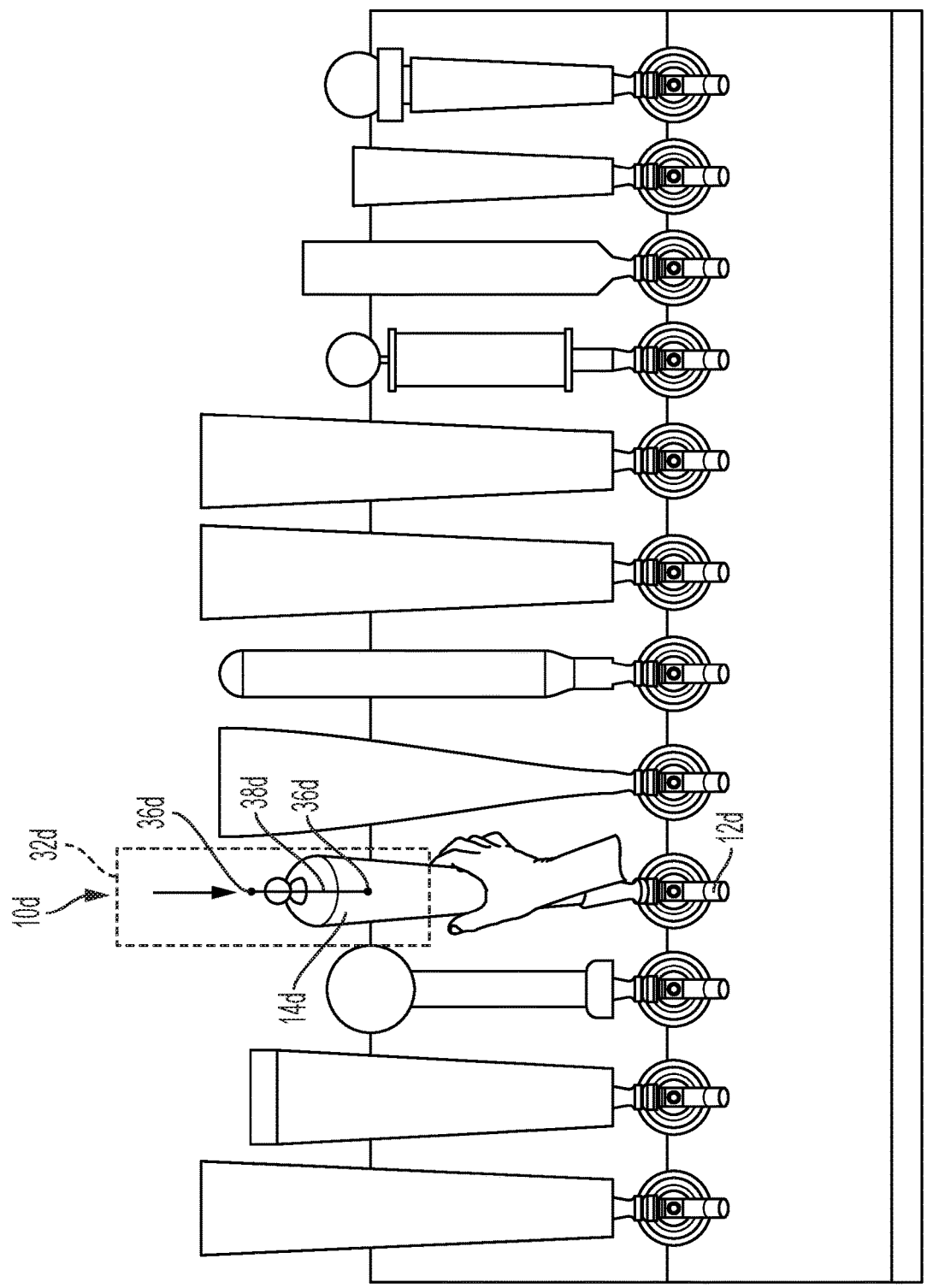
FIG. 4 is a second screenshot of the beer tap station with one handle of a beer tap of the beer tap station in a pulled position.

More particularly, the computer may be programmed to monitor a point 36 on the handle 14 within the bounded box 32. For example, the point 36d within the bounded box 32d may be tracked by the computer 18. When the handle 14d is not pulled, the computer 18 does not register a handle pull because a displacement distance of the point 36 on the handle 14 is zero (0). However, when the handle 14d is pulled as shown in FIG. 4, the computer 18 registers a displacement distance 38d indicating that the beer tap 10d is dispensing beer out of the faucet 12d. When the user pushes the beer tap handle 14d back to its original position as shown in FIG. 3, the displacement distance 38d goes back to zero (0). When the displacement distance 38d is zero (0), the computer assumes or registers that no beer is being dispensed out of the beer tap 10d.

The following is a description of one way that the computer determines whether the handle 14 has been pulled, the length of time of the handle pull and which handle 14a-n has been pulled. In particular, the video feed from the camera 16 is transmitted to the computer. The computer analyzes the pixels within each of the bounded boxes 32 associated with each handle 14a-n. Within the bounded box 32, each of the handles 14 and the background of the handles 14 define a level of light for each pixel. For example, if the bounded box 32 was 10×10 pixels, then for each pixel a light intensity may be associated with each pixel as shown in Table 1 below.

TABLE 1

| 3 | 3 | 3 | 8 | 8    | 8  | 3 | 3 | 3 | 3 |
|---|---|---|---|------|----|---|---|---|---|
| 3 | 8 | 8 | 9 | 9    | 9  | 8 | 3 | 3 | 3 |
| 3 | 8 | 9 | 9 | 10   | 9  | 8 | 3 | 3 | 3 |
| 3 | 8 | 9 | 10| 10   | 10 | 9 | 8 | 3 | 3 |
| 3 | 8 | 9 | 10| [[9]]| 10 | 9 | 8 | 3 | 3 |
| 3 | 8 | 9 | 10| 10   | 10 | 9 | 8 | 3 | 3 |
| 2 | 4 | 8 | 9 | 10   | 9  | 8 | 8 | 2 | 2 |
| 2 | 4 | 7 | 8 | 8    | 8  | 7 | 4 | 2 | 0 |
| 2 | 2 | 2 | 8 | 9    | 8  | 2 | 2 | 2 | 2 |
| 2 | 2 | 2 | 8 | 10   | 8  | 2 | 2 | 2 | 2 |

Each of the handles 14 and bounded box may have a unique light intensity profile on a pixel by pixel basis. Each of the bounded box 32 may have a different size and shape. The 10×10 square-shaped bounded box 32 illustrated herein is for purposes of illustration and not limitation. Although a square-shaped bounded box 32 is shown and described, the bounded box 32 may have other shapes including but not limited to circular, triangular, polygonal.

By mapping a light intensity profile, the computer can track a point 36 on the handle. In the table above, point 36 is identified by the double bracket. When the handle 14 is pulled, the computer can track how far the handle has been pulled by tracking how far the pattern of light levels associated with point 36 has moved. For example, if the computer is tracking the point 36 identified by the double bracket in the table above and the pattern moves down 4 pixels, then the computer can translate the number of pixels to a distance. When point 36 moves above a threshold number of pixels then the computer can register that movement or changes to the light levels on a pixel-by-pixel basis as a pull of the beer tap handle 14. In Table 2, the light levels for each of the pixels have shifted down by 5 pixels.

TABLE 2

| 0 | 0 | 0 | 0  | 0    | 0  | 0 | 0 | 0 | 0 |
|---|---|---|----|------|----|---|---|---|---|
| 0 | 0 | 0 | 0  | 0    | 0  | 0 | 0 | 0 | 0 |
| 0 | 0 | 0 | 0  | 0    | 0  | 0 | 0 | 0 | 0 |
| 0 | 0 | 0 | 0  | 0    | 0  | 0 | 0 | 0 | 0 |
| 0 | 0 | 0 | 0  | 0    | 0  | 0 | 0 | 0 | 0 |
| 3 | 3 | 3 | 8  | 8    | 8  | 3 | 3 | 3 | 3 |
| 3 | 8 | 8 | 9  | 9    | 9  | 8 | 3 | 3 | 3 |
| 3 | 8 | 9 | 9  | 10   | 9  | 8 | 3 | 3 | 3 |
| 3 | 8 | 9 | 10 | 10   | 10 | 9 | 8 | 3 | 3 |
| 3 | 8 | 9 | 10 | [[9]]| 10 | 9 | 8 | 3 | 3 |

Because the bracket or point 36 has moved more than the threshold number of pixels, the computer can register this as a pull of the handle. When the light levels move back to its original pattern shown above, the computer registers this as movement of the handle back to the up position and where no beer is being dispensed. The computer also registers the duration of time for the shifting of the light levels of the pixels to move between the two states to determine the duration of time that the handle has been pulled. The computer monitors and analyzes each of the bounded boxes. Based on which bounded box experiences the shifting of the light levels for the pixels, the computer detects and records which beer tap and which beer has been dispensed.

When the light intensity profiles on a pixel by pixel changes, the computer identifies that to be movement of the handle 14. Moreover, as the pattern of the light intensity profile changes regarding a particular point 36, the computer tracks how far that pattern of light intensity profile has moved to determine the displacement distance 38 of the point 36. When the displacement distance 38 of the point 36 is above a threshold distance, the computer may register that change as a pull of the handle which dispenses beer. When the displacement distance 38 of point 36 is below the threshold distance, the computer does not register that change as a pull of the handle and assumes that no beer is being dispensed.

Referring now to FIG. 5, a data set 50 is shown. The data set 50 receives information from the monitoring system and the point of sale system 15. By way of example and not limitation, the monitoring system, at a minimum, records data anytime a handle 14 of any of the beer taps 10 is pulled.

In FIG. 5, 4 records were inputted into the data set 50 from the monitoring system. The first record shows that beer tap number 4 10d, was dispensed beer at 6:25 PM on December 31st. The handle 14d was pulled and remained in the pulled position for 4.25 seconds. This indicates that a regular size draft beer from beer tap number 4, 10d, was dispensed. The price of $5 was inputted by the computer 18 whenever the duration is between 4 to 5.25 seconds. The second record indicates that beer tap number 3, 10c, was dispensed beer at 6:30 PM on December 31st. The handle was pulled and remained in the pulled position for 6.5 seconds. Any duration of time between 5.25 seconds and 7.5 seconds indicates that a large beer was dispensed.

The cost of the regular-sized beer is $5. The cost of a large beer is $8 in our example. However, it is contemplated that the upper and lower limits for the duration which indicates a regular beer may be adjusted by the user or installer. Moreover, the upper and lower limits for the duration of a large beer can be customized by the user or installer. Moreover, the price associated with the regular or large-sized beer may be customized by the user or installer. Moreover, the costs for each of the small and large beers for each of the beer taps 10 may be adjusted and filled into the price column 52 as desired by programming the computer with the specific price list of the restaurant.

All of the data on the left-hand side of the bar 54 may be inputted or determined based on the monitoring system. The entries may be entered in chronological order. On the right side of the bar 54, the following columns may be filled in by the point of sale system 15—beer tap number 70, size 72, price 74, bartender ID 76. This information is entered into the computer or dataset 50 from the point of sale system 15. The entries can be chronologically recorded.

A simple check to see if all of the beer dispensed from the beer tap station 8 were properly charged can be determined by correlating data from the monitoring system with the data received from the point of sale system 15. By way of example and not limitation, a summation of the prices in column 50 indicates that $26 should have been collected from customers. However, the point of sale system indicates that only $23 were collected from customers. This provides a discrepancy of $3. In order to find out which transaction was an error, the user or installer or computer may match up all of the activities from the monitoring system and the transactions from the point of sale system 15 and find that the second transaction 80 should have been charged $8, not $5. Activity 1, 82, matches up with transaction 1, 84. Activity 3, 86, matches up to transaction 3, 88. Activity 4, 90, matches up to transaction 4, 92. Only activity 2, 92, does not match up to transaction 2, 80. Accordingly, the dataset 50 can be used to spot errors and unauthorized servings of beer.

Another way to determine whether a handle 14 is in the up position or down position (i.e., pulled) is to threshold the light levels within the bounded box 32. A front face 100 of the handle 14 and a background surface 102 within the bounded box 32 may have different light levels. Either the light levels of each pixel of the front face 100 of the handle 14 is significantly higher or lower than the light levels of the background surface 102, or the light levels of each pixel of the background surface 102 is significantly higher or lower than the light levels of each pixel of the front face 100 of the handle 14. In this regard, each pixel within the bounded box 32 may be associated with a 0 or 1 to identify either a high light level or a low light level. By way of example and not limitation, if the full spectrum of light levels is between 1 and 10, any pixel having a light level of 6 to 10 may be assigned the number 1. Any pixel having a light level between 1 and 5 may be assigned the number 0. In this example, the number 1 may be associated with a high light level and the number 0 may be associated with a low light level. The opposite association is also contemplated. In the example discussed herein, the front face 100 of the handle 14 pixels may be associated with high light levels whereas the background surface 102 may be associated with low light levels but the same process may be utilized for the opposite scenario.

In order to determine when the handle 14 has been pulled to the down position, the computer may be programmed to identify when the handle 14 is in the up position and when the handle is in the down position. For example, when the handle is in the up position, a certain number of pixels in the bounded box 32 may have the number 1 and 0 associated with the pixels, as shown in Table 3. Table 3 illustrates the bounded box 32d shown in FIG. 3 when the handle 14 is in the up position. Twenty two (22) pixels are associated with the number 1 or the front face 100 of the handle 14.

TABLE 3

| 0 | 0 | 0 | 0 | 0 | 0 | 0 | 0 | 0 | 0 |
|---|---|---|---|---|---|---|---|---|---|
| 0 | 0 | 0 | 0 | 1 | 1 | 0 | 0 | 0 | 0 |
| 0 | 0 | 0 | 1 | 1 | 1 | 1 | 0 | 0 | 0 |
| 0 | 0 | 0 | 1 | 1 | 1 | 1 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |

When the handle 14 is pulled down as shown in FIG. 4, the number of pixels associated with the number 1 decreases. When the number of pixels associated with the number 1 falls below a threshold number of pixels, the computer may register that the handle 14 has been pulled down or is in the down position. Table 4 illustrates the bounded box 32 and the number of pixels associated with the number one. Twelve (12) pixels are associated with the number 1.

TABLE 4

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 0 | 0 | 0 | 0 |
| 0 | 0 | 0 | 1 | 1 | 1 | 1 | 0 | 0 | 0 |
| 0 | 0 | 0 | 1 | 1 | 1 | 1 | 0 | 0 | 0 |
| 0 | 0 | 0 | 0 | 1 | 1 | 0 | 0 | 0 | 0 |

In order to account for variances in lighting and perhaps the bartender has not pulled the handle 14 all the way down, a threshold number which is greater than the number of pixels associated with the number 1 when the handle 14 is in the down position (e.g., 12 pixels) may be used by the computer to determine when the handle is in the down position. For example, when the number of pixels associated with the number one is 17 or lower, the computer may register that the handle 14 has been pulled to the down position. The threshold number may be 10% or more of a difference between the number of pixels associated with the number 1 when the handle 14 is in the up and down position plus the number of pixels associated with the number 1 when the handle 14 is in the down position. For example, let's set the threshold number to be 50% of the difference between the number of pixels associated with the number 1 when the handle is in the up and down positions plus the number of pixels associated with the number 1 when the handle is in the down position. in the example shown in Tables 3 and 4, 50% of the difference between the number of pixels associated with the number one when the handle is in the up and down positions is (22-12)/2=5. The number of pixels associated with the number one when the handle is in the down position is 12. Hence, the threshold number would be 17 in the example shown in Tables 3 and 4.

In certain situations, the camera 16 and computer may not clearly detect when the handle 14 is pulled downward in the direction of arrow 22. This problem may occur when a front face 100 of the handle 14 has a substantially similar color as a background surface 102 which is behind the handle 14. For example, if the background surface 102 and the front face 100 of the handle 14 is a light color, then the computer may associate the number 1 with all of the pixels within the bounded box 32. In this way, the computer may not be able to distinguish between the front face 100 of the handle 14 and the background surface 102. The problem with detecting the handle's position arises from the lack of contrast between the front face 100 and the background surface 102 when the colors are the same or very close to being the same. The video feed from the camera is sent to the computer for analysis. When the computer analyzes the light levels within the bounded box 32 surrounding the handle 14, the contrast between the front face 100 and the background surface 102 may not be sufficient so that the computer cannot recognize when the handle 14 has shifted between the up and down positions.

To increase the contrast between the front face 100 of the handle 14 and the background surface 102, the front face 100 of the handle 14 may be coated with a high reflectivity coating. By way of example and not limitation, if the camera 16 is an infrared camera, optical or monochrome camera with an IR filter, the front face 100 of the handle 14 or the background surface 102 may be coated with an infrared (IR) reflective coating. By doing so, the IR reflective coating may produce a glare whereas the background surface 102 does not produce a glare. The higher contrast between the surfaces that were and were not coated with the IR reflective coating helps to distinguish between the front face 100 of the handle 14 and the background surface 102. For example, if the front face 100 of the handle 14 is coated with the IR reflective coating, then the camera 16 and the computer 18 will see the front face 100 of the handle 14 as a glare while the background surface 102 will be shown as being darker. The pixels associated with the glare is associated with the number 1. The pixels not having the glare will be associated with the number 0. In this way, the computer 18 can analyze the video feed and determine the number of pixels that the glare from the IR reflective coating encompasses when the handle 14 is in the up position versus when the handle is in the down position. As shown in FIG. 3, when the handle 14 is in the up position, the camera 16 sees the more of the front face 100 of the handle 14 than when the handle 14 is in the down position. However, when the handle 14 is in the down position, as shown in FIG. 4, the camera 16 may not see as much of the front face 100 of the handle 14. Rather, the handle 16 may see a smaller portion of the handle 14. When the handle is in the up position, the number of pixels associated with the glare from the IR reflective coating will be X number of pixels. When the handle is in the down position, and the number of pixels associated with the glare from the IR reflective coding will be some number Y which is smaller than X. When the computer 18 recognizes that the number of pixels associated with the IR reflective coding is Y, the computer may register a handle pull or that the handle is in the down position. When the computer recognizes that the number of pixels associated with the IR reflective coatings is X, the computer may register that the handle is in the up position.

Due to variations in lighting and movements, an allowable variance may be assigned so that even if the number of pixels associated with the IR reflective coating is not exactly but just close to X, the computer may still register that the handle is in the up position. Likewise, even if the number of pixels associated with the IR reflective coatings is not Y but just close to Y, the computer may recognize the handle to be in the down position. The allowable variance may be the threshold number discussed above.

The IR reflective coating has been described as being coated on the front face 100 of the handle 14. However, it is also contemplated that the IR reflective coating may be coated on the background surface 102 but not on the front face 100 of the handle 14. In this case, the metric being monitored to indicate whether the handle 14 is in the upward down position is not the number of pixels associated from the glare (i.e., number of pixels in the bounded box associated with the number 1) from the IR reflective coating but the number of pixels not associated with the glare (i.e., number of pixels in the bounded box associated with the number zero) from the background surface 102.

In both of the embodiments above, a bounded box 32 may be drawn around the handle 14. The bounded box 32 defines the pixels being analyze by the computer to recognize whether the handle 14 is in the up or down position. The bounded box 32 preferably encompass the entire or most of front face 100 of the handle 14. Plus, the bounded box 32 also includes a portion of the background surface 102. Preferably, about 70% or more of a periphery of the handle 14 abuts the background surface 102 in the bounded box 32 when the handle is in the up position.

When the color of the front face 102 of the handle 14 in the background surface 102 is different, the computer can recognize a contrast between the differences in colors of the front face 100 and the background surface 102. However, to further accentuate the contrast between the differences in colors, the color of the background surface 102 may be muted (i.e., blacked out) or the color of the front face 100 may be muted (i.e., blacked out).

To this end, a dual band filter may be placed in front of a monochrome camera. A first band of the dual band filter may be matched to the color of the front face 100 of the handle 14. In this way, light reflected off of the front face 100 is recorded by the camera 16. A second band of the dual band filter may filter out colors complementary to the color of the background surface 102. By doing so, the background surface 102 is recorded as being blacked out. As such, a significant contrast is achieved between the front face 100 and the background surface 102 so that the recorded video image when analyzed by the computer can determine which pixels of the image are that of the handle and which pixels are that not of the handle.

Moreover, by utilizing the dual band filters in front of the camera, any shadows on the background surface 102 created by the handle 14 but recorded by the camera 16 and sent to the computer 18 is also shown as being muted or blacked out. To further accentuate the contrast between the front face 100 of the handle 14 in the background surface 102, the front face 100 of the handle 14 or the background surface 102 maybe coated with the reflective coating. When the camera 16 is an infrared camera, the coating may be an infrared reflective coating.

Another way to determine when the handle 14 has been traversed from the up position to the down position and vice versa is too monitor a pixel associated with the number one or pixel associated with the handle 14. When the pixel associated with the handle (e.g., number 1) is changed to a different number (e.g., number 0), then the computer may register a pull of the handle 14 or traversal of the handle 14 to the down position. Conversely, when the pixel associated with the handle is change from 0 to 1, the computer may register that the handle 14 has been reversed back to the up position.

Below is a reproduction of Table 3 but with rows and columns labeled as letters and numbers. The computer may monitor pixel at row B, column 6. When the handle 14 is in the up position as shown or reflected by the zeros and ones in Table 3A below, the pixel at row B, column 6 is associated with the number one.

TABLE 3A

|   | 1 | 2 | 3 | 4 | 5 | 6 | 7 | 8 | 9 | 10 |
|---|---|---|---|---|---|---|---|---|---|----|
| A | 0 | 0 | 0 | 0 | 0 | 0 | 0 | 0 | 0 | 0  |
| B | 0 | 0 | 0 | 0 | 1 | 1 | 0 | 0 | 0 | 0  |
| C | 0 | 0 | 0 | 1 | 1 | 1 | 1 | 0 | 0 | 0  |
| D | 0 | 0 | 0 | 1 | 1 | 1 | 1 | 0 | 0 | 0  |
| E | 0 | 0 | 0 | 0 | 1 | 1 | 0 | 0 | 0 | 0  |
| F | 0 | 0 | 0 | 0 | 1 | 1 | 0 | 0 | 0 | 0  |
| G | 0 | 0 | 0 | 0 | 1 | 1 | 0 | 0 | 0 | 0  |
| H | 0 | 0 | 0 | 0 | 1 | 1 | 0 | 0 | 0 | 0  |
| I | 0 | 0 | 0 | 0 | 1 | 1 | 0 | 0 | 0 | 0  |
| J | 0 | 0 | 0 | 0 | 1 | 1 | 0 | 0 | 0 | 0  |

Below is a reproduction of Table 4 but with rows and columns labeled as letters and numbers. The computer continues to monitor pixel at row B, column 6. When the handle 14 is in the down position as shown or reflected by the zeros and ones in Table 4A below, the pixel at row B, column 6 is associated with the number zero. When this change occurs, the computer may register that the handle 14 has been traversed from the up position to the down position. Conversely, when the change is from 0 to 1, the computer may register that the handle has been traversed from the down position to the up position.

TABLE 4A

|   | 1 | 2 | 3 | 4 | 5 | 6 | 7 | 8 | 9 | 10 |
|---|---|---|---|---|---|---|---|---|---|----|
| A | 0 | 0 | 0 | 0 | 0 | 0 | 0 | 0 | 0 | 0  |
| B | 0 | 0 | 0 | 0 | 0 | 0 | 0 | 0 | 0 | 0  |
| C | 0 | 0 | 0 | 0 | 0 | 0 | 0 | 0 | 0 | 0  |
| D | 0 | 0 | 0 | 0 | 0 | 0 | 0 | 0 | 0 | 0  |
| E | 0 | 0 | 0 | 0 | 0 | 0 | 0 | 0 | 0 | 0  |
| F | 0 | 0 | 0 | 0 | 0 | 0 | 0 | 0 | 0 | 0  |
| G | 0 | 0 | 0 | 0 | 1 | 1 | 0 | 0 | 0 | 0  |
| H | 0 | 0 | 0 | 1 | 1 | 1 | 1 | 0 | 0 | 0  |
| I | 0 | 0 | 0 | 1 | 1 | 1 | 1 | 0 | 0 | 0  |
| J | 0 | 0 | 0 | 0 | 1 | 1 | 0 | 0 | 0 | 0  |

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A monitoring system for a beer tap station, the system comprising:
    a beer tap having a handle and a faucet, the handle having an up position where beer is not flowing through the faucet and a pulled position where beer is flowing through the faucet;
    an image capture device mounted above and in front of the beer tap with a field of view of the image capture device encompassing the handle and a background;
    a computer that receives video pixel by pixel data from the image capture device that is associated with the handle and the background, the computer is operative to assign light level to each pixel to determine when and how long the beer tap handle has been traversed from the up position to the pull position then back to the up position, based on a difference between a light level of the handle and a light level of at least a portion of the background; and
    a filter disposed in front of a lens of the image capture device for filtering in light in visible spectrum or infrared spectrum into the image capture device; and
    a light emitting device positioned with respect to the image capture device such that light generated by the light emitting device is directed toward the beer tap handle, reflected off of the beer tap handle, and received by the image capture device.

2. The system of claim 1 wherein the image capture device is an infrared video camera, and the system further comprises an infrared light adjacent to the image capture device and positioned to shine infrared light onto the beer tap handle and the background.

3. The system of claim 1 wherein the image capture device is an optical video camera with the filter, which includes an infrared filter, disposed in the front of the lens, and the system further comprises an infrared light adjacent to the image capture device and positioned to shine infrared light onto the beer tap handle and the background.

4. The system of claim 1 wherein the computer tracks a number of pixels that a pattern moves when the computer determines that the handle has been traversed from the up position to the pulled position, based on the difference between the light level of the handle and the light level of at least the portion of the background as assigned to each pixel by the computer.

5. The system of claim 1 further comprising a dark background behind the beer tap handle so that the image capture device sees the dark background when a bartender traverses the beer tap handle to the pulled position.

6. The system of claim 1 wherein the beer tap is positioned in a bar without a line of sight to an exterior window.

7. A method of monitoring a beer tap, the method comprising:
    receiving pixel data of a beer tap handle from an image capture device positioned with its field of view encompassing the beer tap handle, the pixel data associated with light levels;
    transmitting the pixel data to a computer;
    defining an area of interest in the field of view of the image capture device, to correspond to the beer tap handle;
    analyzing the pixel data by comparing two frames to determine if and when the beer tap handle has been pulled from an up position to a pulled position and back to the up position, wherein the analyzing includes analyzing the data from the image capture device in relation to only the area of interest;
    a filter disposed in front of a lens of the image capture device for filtering in light in visible spectrum or infrared spectrum into the image capture device; and
    a light emitting device positioned with respect to the image capture device such that light generated by the light emitting device is directed toward the beer tap handle, reflected off of the beer tap handle, and received by the image capture device.

8. The method of claim 7, wherein the image capture device is an infrared video camera, and an infrared light is provided adjacent to the image capture device and is positioned to shine the infrared light onto the beer tap handle.

9. The method of claim 7, wherein the image capture device is an optical video camera with the filter, which includes an infrared filter, disposed in the front of the lens, and an infrared light is adjacent to the image capture device and is positioned to shine the infrared light onto the beer tap handle.

10. The method of claim 7, wherein the analyzing comprises a computer tracking a number of pixels that a pattern moves when the computer determines that the handle has been traversed from the up position to the pulled position.

11. The method of claim 7, further comprising a dark background behind the beer tap handle so that the image capture device sees the dark background when a bartender traverses the beer tap handle to the pulled position.

12. The method of claim 7, wherein the beer tap is positioned in a bar without a line of sight to an exterior window.

13. A monitoring system for a beer tap station, the system comprising:
   a beer tap having a handle and a faucet, the handle having an up position where beer is not flowing through the faucet and a pulled position where beer is flowing through the faucet;
   a mounting bracket disposed above and in front of the beer tap;
   an image capture device mounted to the mounting bracket with a field of view of the image capture device encompassing the handle and the faucet;
   a computer that receives video pixel by pixel data from the image capture device, the computer is operative to assign light level to each pixel to determine when and how long the beer tap handle has been traversed from the up position to the pull position then back to the up position,
   wherein the image capture device further comprises:
      a filter disposed in front of a lens of the image capture device for filtering in light in visible spectrum or infrared spectrum into the image capture device;
      a light emitting device positioned with respect to the image capture device such that light generated by the light emitting device is directed toward the beer tap handle, reflected off of the beer tap handle, and received by the image capture device.

14. The system of claim 13, wherein the image capture device is an infrared video camera, and the system further comprises an infrared light adjacent to the image capture device and positioned to shine infrared light onto the beer tap handle.

15. The system of claim 13, wherein the image capture device is an optical video camera with the filter, which includes an infrared filter disposed in the front of the lens, and the system further comprises an infrared light adjacent to the image capture device and positioned to shine infrared light onto the beer tap handle.

16. The system of claim 13, wherein the computer tracks a number of pixels that a pattern moves when the computer determines that the handle has been traversed from the up position to the pulled position.

17. The system of claim 13, further comprising a dark background behind the beer tap handle so that the image capture device sees the dark background when a bartender traverses the beer tap handle to the pulled position, and wherein the beer tap is positioned in a bar without a line of sight to an exterior window.

* * * * *